United States Patent [19]

Karagoz

[11] Patent Number: 4,475,207
[45] Date of Patent: Oct. 2, 1984

[54] GRAPHITIZATION FURNACE LOADING APPARATUS

[75] Inventor: Berch Y. Karagoz, Grand Island, N.Y.

[73] Assignee: Great Lakes Carbon Corporation, New York, N.Y.

[21] Appl. No.: 315,161

[22] Filed: Oct. 26, 1981

Related U.S. Application Data

[63] Continuation-in-part of Ser. No. 289,249, Aug. 3, 1981.

[51] Int. Cl.$^3$ .............................................. F27D 3/00
[52] U.S. Cl. .................................... 373/115; 373/120; 254/131; 294/67 EA; 294/74; 294/81 R
[58] Field of Search ................. 254/43, 46, 130–132; 294/67 E, 67 EA, 74, 81 R; 373/120, 115

[56] References Cited

U.S. PATENT DOCUMENTS

| | | | |
|---|---|---|---|
| 1,029,121 | 6/1912 | Heroult | 373/131 |
| 2,692,159 | 10/1954 | Croswell et al. | 294/81 R |
| 4,015,068 | 3/1977 | Vohler | 373/120 |
| 4,086,380 | 4/1978 | Juel | 428/65 |

FOREIGN PATENT DOCUMENTS

| | | |
|---|---|---|
| 2832564 | 2/1980 | Fed. Rep. of Germany . |
| 47-3442 | 1/1972 | Japan . |
| 54034/70 | 6/1974 | Japan . |
| 1290276 | 9/1972 | United Kingdom . |

*Primary Examiner*—Roy N. Envall, Jr.
*Attorney, Agent, or Firm*—Adrian J. Good

[57] ABSTRACT

An apparatus 12 is specially adapted to conserve time, energy, labor and enhance safety when loading a column 10 of cylindrical carbon electrodes or carbon bodies of uniform cross section in end-abutting relationship into a lengthwise graphitization furnace 20.

After aligning a column of electrodes 10 on a stock aligning conveyor, a rigid truss 12 is fitted with chain slings 16, actuator mechanisms 14 and positioning jigs 59 holding the column 10 in precise axial alignment. Support or gooseneck structure 54 rests on the furnace structure and may be adjusted to center the column 10 vertically by shims 64 with respect to the head electrodes 22 of the furnace.

1 Claim, 10 Drawing Figures

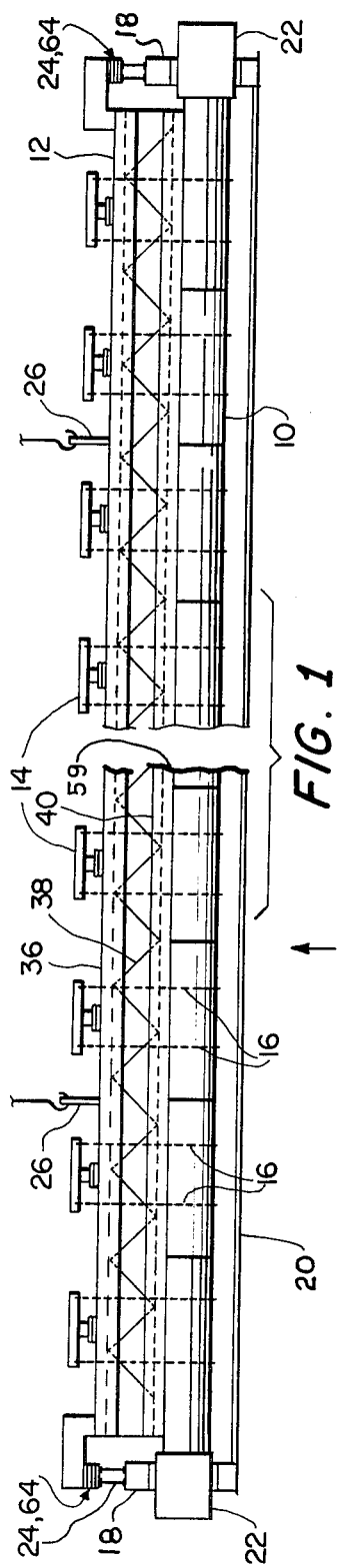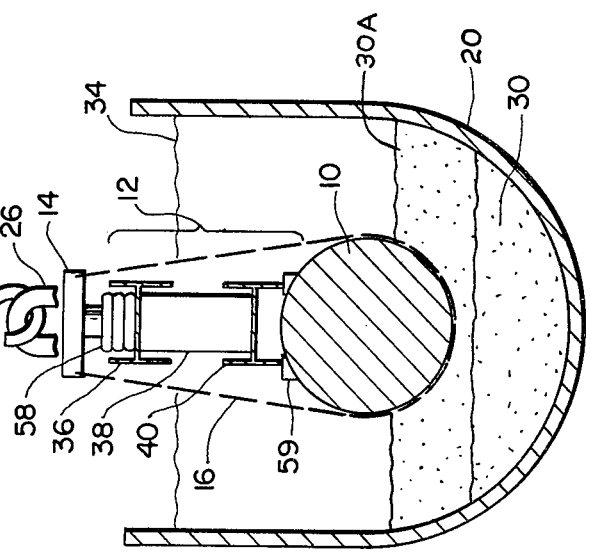

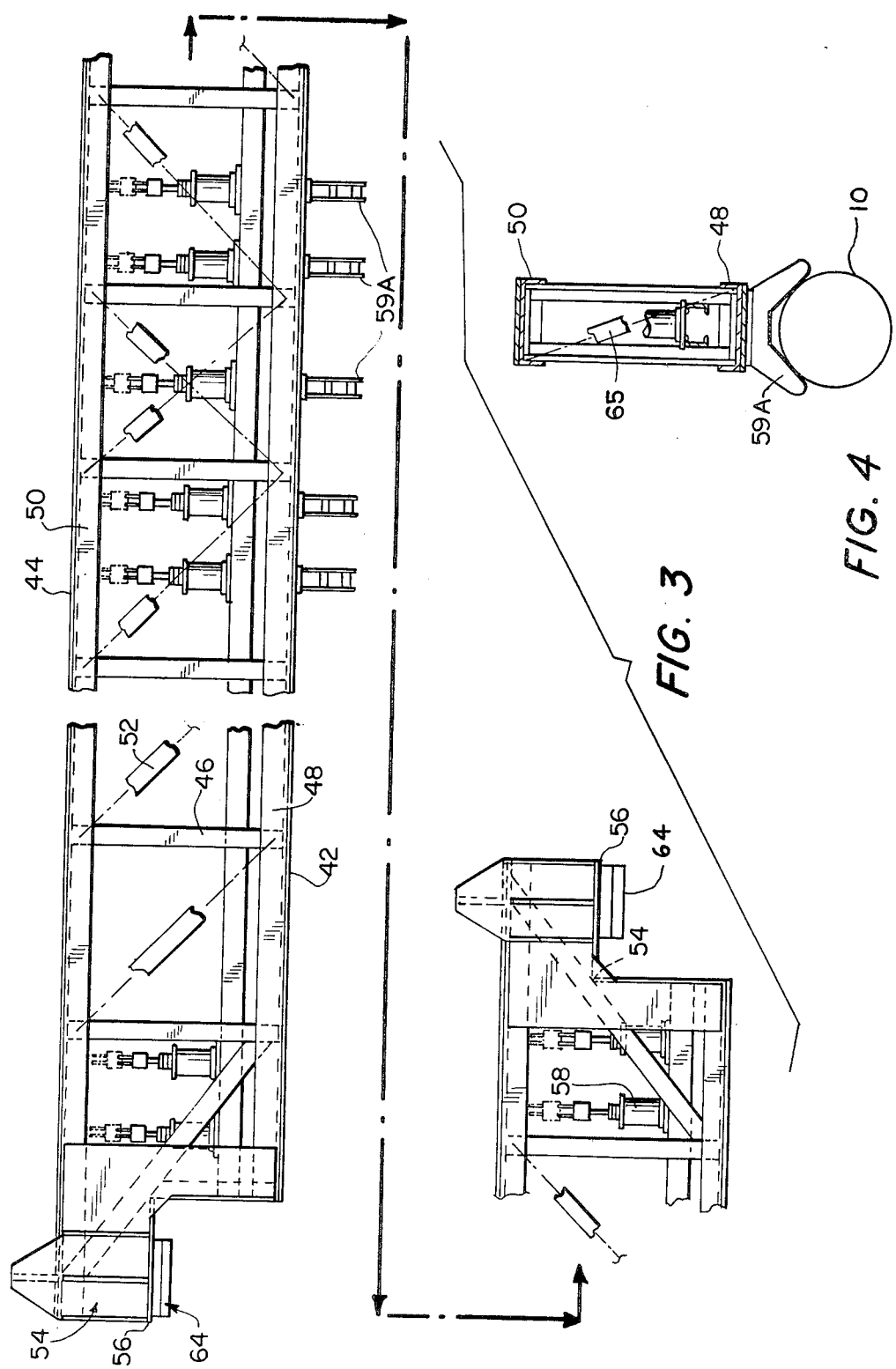

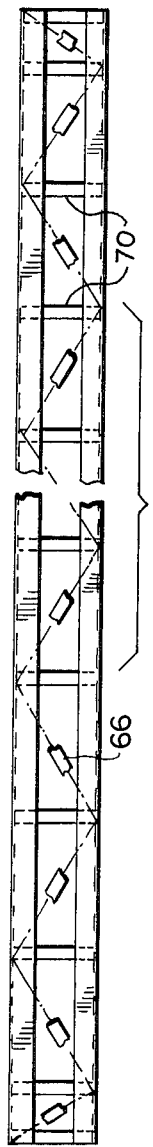
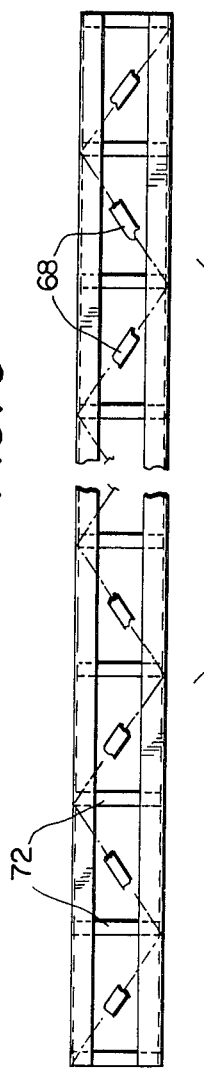
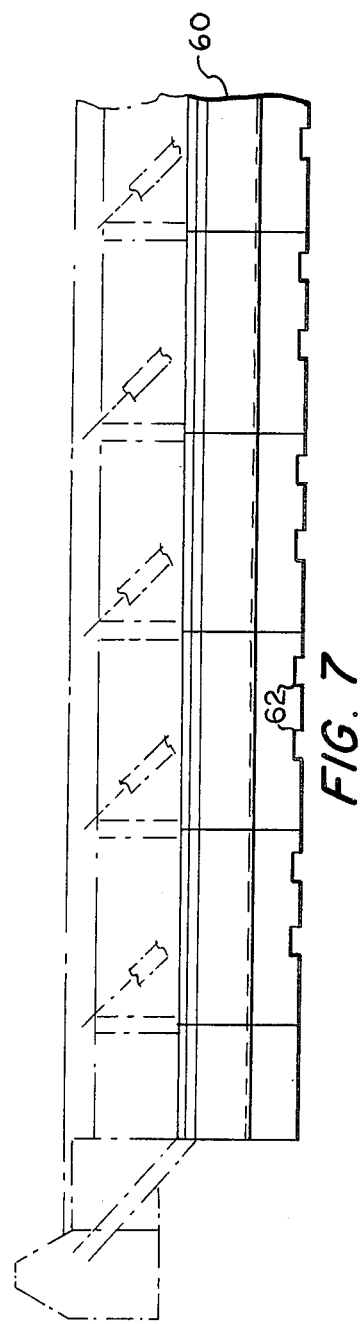
FIG. 5
FIG. 6
FIG. 7

GRAPHITIZATION FURNACE LOADING APPARATUS

DESCRIPTION

This application is a continuation-in-part of my co-pending application Ser. No. 289,249, filed Aug. 3, 1981.

BACKGROUND OF THE INVENTION

1. Field of the Invention

This invention is related to a method and apparatus for carrying out the production of graphite electrodes.

Carbon and graphite electrodes are used in many electrochemical processes, including the production of magnesium, chlorine, iodine, phosphorus, steel, and the production of aluminum in Hall cells. The word carbon denotes the amorphous form of carbon, and graphite denotes the multilayered hexagonal crystalline form of carbon.

Carbon electrodes consist of the essentially amorphous carbon from petroleum coke which has been calcined, ground, classified by size, mixed with a binder, and bound in a matrix of amorphous carbon derived from the binder after baking at temperatures of approximately 800° to 900° C. in a baking furnace. Graphite electrodes are produced from the carbon forms by placing them in an Acheson furnace and, in recent years, in a Lengthwise Graphitization (LWG) type furnace and heating them to a temperature between 2500° to 3000° C., which converts the amorphous form of carbon to the crystalline graphite, and vaporizes most of the impurities present in the original carbon, including most metals and sulfur compounds.

Graphite, compared to amorphous carbon, has much higher electrical and thermal conductivity, lower coefficient of thermal expansion (CTE), superior ductility and vastly superior thermal shock resistance at the operating temperatures of the electric arc steel furnace. These physical properties are uniquely valuable in the electric furnace, with its need for high electrical currents, and the need to resist the mechanical and thermal stresses imposed on the electrodes from the falling scrap, fluctuations in metal and electrode level, and generally high thermal stresses. Consequently, graphite is universally used as an electrode in the electric arc melting of steel.

The production of graphite electrodes from the so-called carbon electrodes has traditionally been carried out in the Acheson furnace in which the electrodes are placed in a transverse orientation to the flow of the electrical current, with the current passing alternately through tiers of electrodes and resistor media, the latter being typically metallurgical or petroleum coke. The Acheson process is of such ancient vintage and so well known as not to require any further description. The LWG process, although also very old, is less well known and has been practiced on a commercial scale only in recent years. The LWG process is carried out by arranging the carbon electrodes in a continuous column with an electrical connection at each end of the column. See U.S. Pat. No. 1,029,121 Heroult, June 11, 1912 and U.S. Pat. No. 4,015,068, Vohler, Mar. 29, 1977. The electrodes are arranged so that the electrodes themselves form the dominant path for the heating current, with one or both of the ends of the column subjected to a mechanical or hydrostatic pressure source in order to keep the connection tight under expansion or contraction of the column during the heating cycle. Vohler does not use a packing medium, but discloses a metal shell with a felt linear as insulation.

The LWG process has many advantages over the Acheson process. The energy efficiency is much higher, as the material is heated directly instead of indirectly, and the cycle time for the process is much faster taking typically less than 12 hours as compared to 60 to 120 hours for the Acheson process.

SUMMARY OF THE INVENTION

The LWG furnace utilized in this invention is essentially an open-topped or covered U-shaped steel receptacle of approximately 25–30 m in in length, lined with a refractory and fitted with head electrodes at both ends. At least one of the electrodes is movable, usually with a hydraulic cylinder, and connected electrically to a substantial source of electrical current. See my co-pending application Ser. No. 289,249, filed Aug. 3, 1981.

The operating cycle of an LWG furnace includes the four phases of loading, firing, cooling and unloading. In prior practice, the typical loading operation of an LWG furnace would involve as the first step, preparation and leveling of the furnace bed. When starting with an empty or unloaded furnace, this step is accomplished by a partial fill of insulating medium and compaction and leveling of the insulating medium by means of vibrators and/or plows in order to assure a level surface of appropriate height for the support of the column of electrodes. The insulating and packing medium may be a sized grade of calcined petroleum coke fines such as may be recovered from the settling chamber of a rotary kiln installation. The particle size range most useful is from 3.9 to 39 mesh/cm (10 to 100 mesh/in).

The next step would involve placement of each electrode into position on the compacted surface of insulating medium typically by means of lifting clamps or slings and the use of an overhead crane. The alignment of the electrodes into a substantially straight column concentric with the head electrodes of the furnace and at appropriate relative spacing is necessary in order to assure good and uniform electrical contact and prevent buckling of the column when subjected to the mechanical or hydrostatic pressure source. This would typically be accomplished by partially lifting each electrode with the crane and repositioning each electrode by use of levers, etc., and by making minor corrections to the surface of the insulating medium.

The loading procedure described above is slow because of the necessity to wait until the furnace and packing medium have cooled before reloading and the time necessary to place each electrode in the column and align the column using aids, such as string lines, levels and/or optical instrumentation, prior to completely covering the column with the insulating medium.

My invention contemplates a complete system for hot loading and mechanical handling of both the packing medium and of the electrodes, conserving both the sensible heat of the packing medium and furnace as well as valuable time and labor while enhancing operator safety.

The novel procedure as a first step involves prealignment of a column of electrodes in perfect alignment at a location away from the furnace. This is accomplished by means of a stock aligning conveyor equipped with rollers suitably tapered or arranged as to form an accurate V-shaped stock aligning trough. The preloading apparatus or truss, also referred to as the column assembly jig, consists of a structural truss of sufficient rigidity to hold and lift the column of baked electrodes in alignment, with a fixture or a pair of continuous bars so arranged as to form an accurate and continuous trough for the holding of the column of electrodes in alignment and chain slings operated by lifting mechanisms such as air cylinders or air bags.

After positioning of the electrodes on the stock aligning conveyor, the column assembly jig is lowered onto the column, the chain slings hooked and tightened. The aligned and preassembled column is then moved by means of an overhead crane or cranes to the LWG furnace and placed and positioned into concentricity with the two head electrodes which are at each end of the furnace. Suitable fixtures are located at each end of the furnace to facilitate the positioning maneuver and accurate shim blocks are employed to raise or lower the support or resting points of the column assembly jig relative to the furnace centerline in order to compensate for the various diameters of the electrodes.

After positioning in the furnace, the column is partially covered with the packing medium and the medium compacted by means of vibrators; next, the chain slings are released and the column assembly jig lifted and removed from the furnace. The column is then completely covered with the packing medium which makes the furnace ready for the application of hydrostatic pressure and electrical current for firing. By the above procedure, workers can reload the furnace very quickly and safely, while still hot, after a previous charge is unloaded. Furthermore, the hot insulating medium from the previous charge or another unloaded furnace can be reused readily, thus conserving heat energy between charges as disclosed in my co-pending patent application, Ser. No. 289,249, filed Aug. 3, 1981. By preloading the column, time is saved and the column is positioned in the furnace more precisely and with less error than was possible under the past practice of furnace loading.

DESCRIPTION OF THE PREFERRED EMBODIMENT

The preferred structure is a rigid truss fitted with chain slings actuated by cylinders or air bag lift mechanisms and a jig trough to position the column of electrodes firmly aligned in place and attached to the truss. Each end of the truss is horizontally centered to the furnace hand electrodes by means of a fixture arrangement between truss and furnace end, and vertically centered by accurate shim blocks designed to compensate for each given stock diameter. A heat shield under the truss reflects heat away from the truss when loading a furnace which is hot and/or partially filled with hot insulation medium. The truss is moved by crane from a preassembly station to the furnace.

DESCRIPTION OF THE DRAWINGS

In FIG. 1 is a longitudinal section of a loaded column in place in the furnace and FIG. 2 is a cross-section viewed from the end.

FIG. 1, the column of electrodes 10, suspended from preloading apparatus or truss, also referred to as the column assembly jig 12 by air bag actuator mechanisms 14, chains 16, and aligning fixture or trough 59 is placed in the furnace having a shell 20 and headwall 18. The truss arrangement of the column assembly jig shown has upper H beam 36, stiffeners 38 and lower H beam 40. Graphite head electrodes 22 transmit current from a rectiformer and apply pressure via hydraulic cylinders (not shown). The column assembly jig is aligned with the furnace centerline by fixtures 24 and shims 64 in accurate placement. The jig is moved by crane from attachments 26.

In FIG. 2, the column of electrodes 10 is shown in position suspended over the mass of packing medium 30 residual from previous furnace charge, with truss 12, chains 16, actuator 58, and crane attachment 26. After the column is positioned and aligned with the head electrodes, a partial fill of packing medium 30A is added and compacted by vibration to support and stabilize the electrodes 10. After this, the chains 16 are released and the column assembly jig 12 lifted away. The remainder of the packing medium is then added, raising the level to 34 before firing.

FIG. 3 is a side elevation of another version of the invention comprising a box truss. Bottom plate 42 and top plate 44 are joined by vertical braces 46 resting on angles 48 and 50. Diagonal braces 52 further stiffen the structure. Each end of the truss is fitted with a gooseneck structure 54 which rests on support fixtures incorporated at each end of the furnace (not shown) through plate 56. Actuators 58, either mechanical, air bag, or air cylinder, tighten the chain slings 16 (not shown) holding the electrodes against fixtures 59A. Shims 64 are placed under support plate 56 to center the column vertically with respect to the head electrodes.

FIG. 4 is an end view of the box truss in FIG. 3, showing fixture 59A with an electrode 10 in position. The truss is also stiffened with diagonal braces 65 from opposite corners of each section.

FIG. 5 is a top view and FIG. 6 is a bottom view showing diagonal bracing 66 and 68, with cross-braces 70 and 72.

FIG. 7 is a side view of the truss with the heat shield 60 in place, a non-structural element serving to reflect heat away from the truss when hot packing medium is poured into the furnace. Notches 62 allow placement of the chain slings 16 (not shown) under the electrodes 10.

Figure 8:
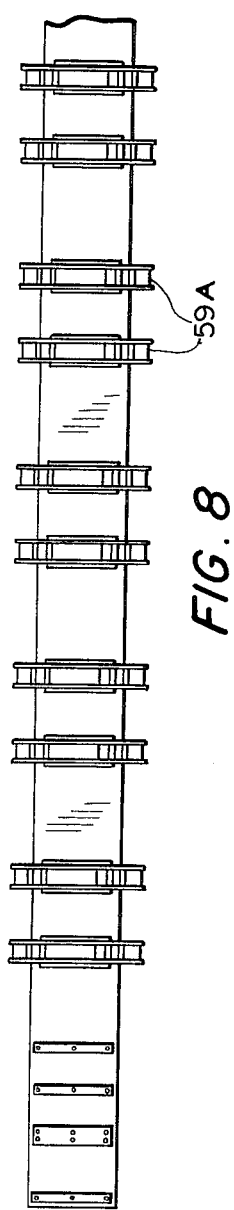
FIG. 8 is a bottom view of the truss with fixtures 59A in place.
Figure 10:
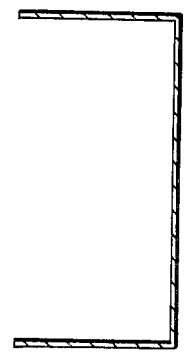
FIG. 10 is an end view of the heat shield 60.
Figure 9:
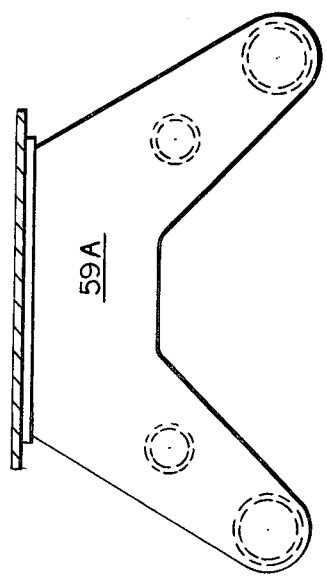
FIG. 9 is a side view of 59A, useful to hold electrodes of various diameters in contact and in precise centered position.

I claim:

1. An apparatus to preassemble a column of baked carbon electrodes of uniform cross section in end-abutting relationship for loading in a furnace having head electrodes at each end thereof and to hold said electrodes in precise axial alignment with each other and with mating fixtures and to position said electrodes in a support, said apparatus comprising a rigid truss, clamping means effective to hold said electrodes in contact with said truss in prescise transverse and axial alignment comprising a plurality of chain slings spaced at intervals along and attached to said truss, one end of each of said slings detachable whereby said slings are placeable around said electrodes and reattachable to said truss to hold said electrodes dependent from said truss, actuator mechanisms on said truss connected to said slings whereby said slings may be drawn up to hold said electrodes positioned against and in precise alignment with said truss positioning jigs, said slings releasable and removable when said column of electrodes is positioned in said furnace and supported by packing medium, means for alignment of said truss comprising mating fixtures at each end of said truss centered laterally and equidistant above the centerline of said truss adapted to mate with precisely located support means at each end of said furnace, at least one crane attachment point, the whole effective to preassemble said column of electrodes in precise axial end-abutting relationship, to place said column of electrodes horizontally in a support in said furnace while maintaining precise alignment of said column of electrodes in said furnace and between said furnace head electrodes, and to allow release of said column of electrodes from said truss while maintaining precise alignment of said column of electrodes.

* * * * *

UNITED STATES PATENT AND TRADEMARK OFFICE
CERTIFICATE OF CORRECTION

PATENT NO. : 4,475,207
DATED : October 2, 1984
INVENTOR(S) : Berch Y. Karagoz

It is certified that error appears in the above-identified patent and that said Letters Patent is hereby corrected as shown below:

Column 2, line 3, "linear" should be --liner--.
Column 2, line 14, "25-30 m" should be --25-50 m--.
Column 3, line 51, "hand" should be --head--.

Signed and Sealed this

Nineteenth Day of March 1985

[SEAL]

*Attest:*

DONALD J. QUIGG

*Attesting Officer*     *Acting Commissioner of Patents and Trademarks*